(12) United States Patent
Takahashi

(10) Patent No.: US 6,396,821 B1
(45) Date of Patent: May 28, 2002

(54) RADIO COMMUNICATION APPARATUS OF DIVERSITY TRANSMISSION SYSTEM

(75) Inventor: Hidehiro Takahashi, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/101,974

(22) PCT Filed: Dec. 5, 1997

(86) PCT No.: PCT/JP97/04473

§ 371 (c)(1),
(2), (4) Date: Nov. 6, 1998

(87) PCT Pub. No.: WO98/25357

PCT Pub. Date: Jun. 11, 1998

(30) Foreign Application Priority Data

Dec. 5, 1996 (JP) .............................. 8-324965

(51) Int. Cl.$^7$ .............................................. H04B 7/216
(52) U.S. Cl. ...................................... 370/335; 455/562
(58) Field of Search ................................ 370/328, 329, 370/330, 335, 336, 342, 343, 345; 455/68, 69, 70, 71, 72, 101, 103, 104, 105, 132, 133, 134, 135, 136, 137, 269, 272, 273, 561, 562

(56) References Cited

U.S. PATENT DOCUMENTS 5,303,240 A * 4/1994 Borras et al. ................ 370/347
5,940,452 A * 8/1999 Rich ........................... 375/347
5,960,330 A * 9/1999 Azuma ......................... 455/70
6,006,075 A * 12/1999 Smith et al. ................. 455/101
6,055,230 A * 4/2000 Feuerstein et al. ........... 370/335

FOREIGN PATENT DOCUMENTS

JP  7-283779   10/1995   ............ H04B/7/26
JP  7-105753   11/1995   ............ H04B/7/04

* cited by examiner

Primary Examiner—Kwang Bin Yao
(74) Attorney, Agent, or Firm—Gray Cary Ware & Freidenrich LLP

(57) ABSTRACT

A radio communication apparatus with a diversity transmission function is provided with an auxiliary transmitter Further to transmitters peculiar to channels. CDMA system signals received by antennas are modulated for respective channels, a maximum reception power level of each channel is detected, and an antenna with a maximum level is found. In a diversity transmission control, it is determined whether or not maximum reception levels of all channels are equal to or higher than a predetermined level. If the maximum reception levels of all channels are equal to or higher than the predetermined level, an ordinary diversity control is performed. Specifically, transmission signals of respective channels are transmitted from antennas with maximum reception power levels via the transmitters peculiar to the channels. If the maximum reception level of any one of the channels is the predetermined level or less, the transmission signal of the associated channel is transmitted from the antenna with a second highest reception power level of the channel via the auxiliary transmitter, Further to the ordinary diversity control.

12 Claims, 4 Drawing Sheets

RADIO COMMUNICATION APPARATUS OF DIVERSITY TRANSMISSION SYSTEM

TECHNICAL FIELD

The present invention relates to a radio communication apparatus in which a transmission antenna is selected by a diversity transmission system.

BACKGROUND ART

In the field of mobile communications, a diversity technique is used to prevent degradation of communication quality due to phasing, etc. An example of the diversity technique is a diversity transmission system adopted in a base station of PHS (personal Handyphone System).

In the diversity transmission system, a plurality of antennas are provided and a transmission signal from a mobile station (radio communication terminal) is received by the plural antennas. On the basis of reception results by the plural antennas, an antenna with highest communication quality is found and a signal is transmitted to the mobile station from this antenna. This system is advantageous in that since the antenna is selected on the basis of the degree of phasing at antenna, there is no load on the mobile station side.

However, if the diversity transmission system is applied to base station equipment of a mobile communication unit of a multi-channel access system such as CDMA (Code Division Multiple Access), the following drawback will arise. In the case of CDMA, an up link from a mobile station to a base station is easily interfered with by another channel. If communication quality of all propagation paths is degraded by such interference, detection precision of parameters indicating communication quality of each path also deteriorates and the selected antenna is not necessarily the best one.

In order to prevent this problem, it is possible to reduce the influence of interference by decreasing the number of multiplexed channels. With this method, however, a new problem arises in that the efficiency of radio resource use such as frequency will also decrease.

As described above, when multi-channel communication is performed in the conventional radio. communication apparatus of diversity transmission system, if the communication quality of all communication paths deteriorates due to inter-channel interference, the best antenna will not necessarily be selected for communication.

The present invention has been made in order to solve this problem, and its object is to provide a radio communication apparatus capable of selecting the best antenna and enhance communication quality without lowering the efficiency of use of frequency.

DISCLOSURE OF INVENTION

In a radio communication apparatus having a diversity transmission function according to the present invention, a signal in which plural channels are multiplexed is received via a plurality of paths, a best path is selected, and signals are transmitted via the selected path. The apparatus comprises transmitters, the number of which is greater than the number of the multiplexed channels, and means for transmitting transmission signals of some channels via the plural transmitters and the plural paths.

Since the transmission signal of a certain channel is transmitted via plural transmitters and paths, the possibility of erroneous selection of paths is decreased. As a result, the communication quality can be enhanced. Further, when a great number of channels are multiplexed, an up link will easily interfere with another channel. In the prior art, in order to prevent erroneous selection of paths, the number of channels to be multiplexed is reduced and the frequency use efficiency is decreased. According to the present invention, the diversity transmission control can be performed without decreasing the frequency use. efficiency.

BEST MODE OF CARRYING OUT THE INVENTION

An embodiment of a radio communication apparatus according to the present invention will now be described with reference to the accompanying drawings.

Figure 1:
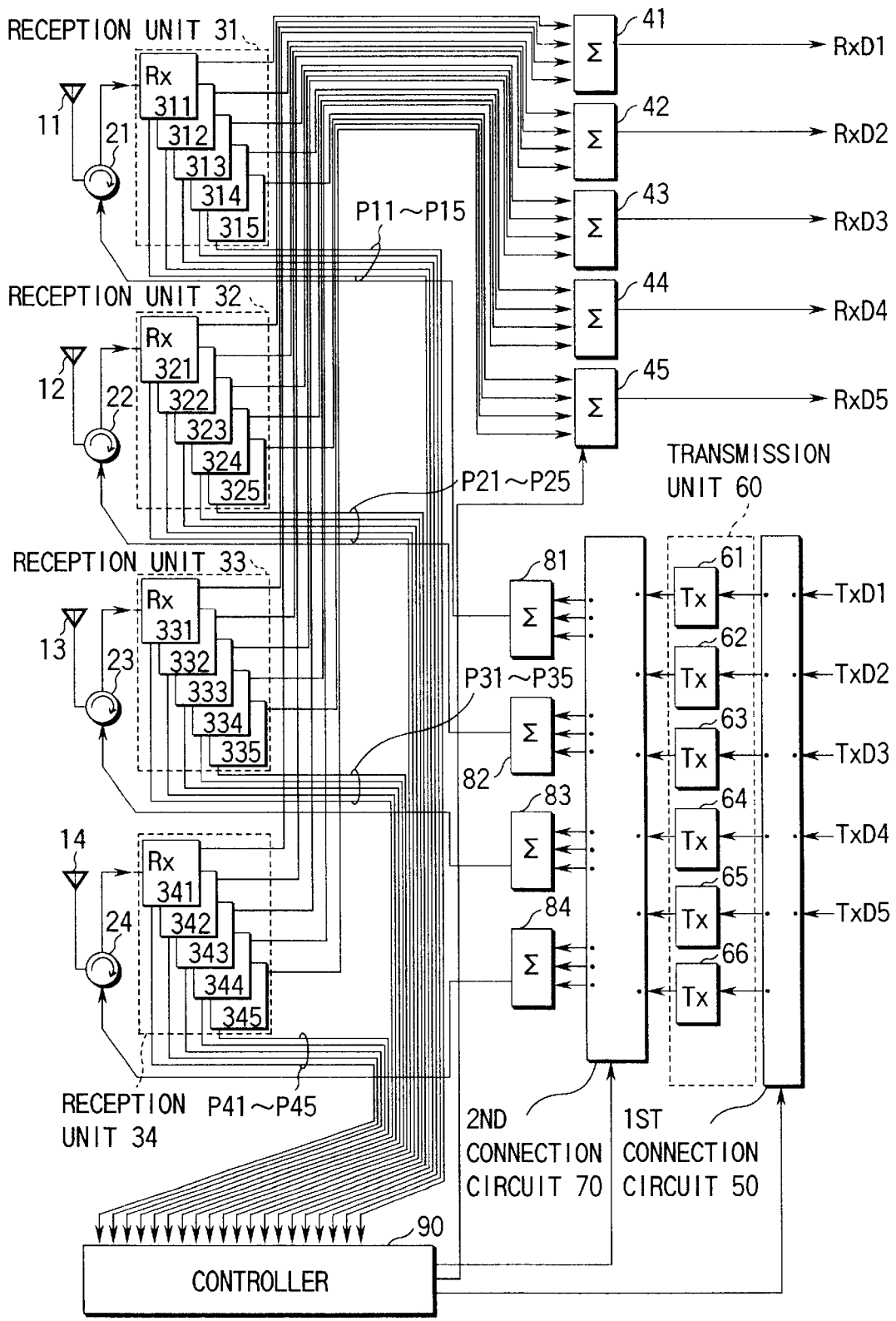
FIG. 1 is a block diagram showing the structure of base station equipment for mobile communication of CDMA system as a first embodiment of a radio communication apparatus of a diversity transmission system according to the present invention.

FIG. 1 shows the structure of equipment-relating to a diversity transmission function of a base station for mobile communication of CDMA system according to the embodiment of the invention. In this embodiment, the number of diversity antennas is four and the number of multiplexed channels is five.

The communication apparatus of the base station has four diversity antennas 11 to 14 provided at different locations, e.g. four corners of a square. It is known that a diversity effect can be obtained if the distance between antennas is about ¼ or more of the wavelength. The antennas 11 to 14 are connected to transmission/reception switching circuits 21 to 24; respectively. Each transmission/reception switching circuit 21 to 24 comprises, e.g. a circulator which corresponds to a time division duplex system (TDD) in which a transmission signal and a reception signal are duplexed on the same time axis. Signals transmitted from a mobile station (not shown) and received by the antennas 11 to 14 via propagation paths in the air are output from the transmission/reception switching circuits 21 to 24 and supplied to reception units 31 to 34.

Each reception unit 31 to 34 comprises five receivers (Rx) 311 to 315; 321 to 325; 331 to 335; 341 to 345 so as to receive signals of five channels. The receivers 311, 321, 331 and 341 receive signals of the first channel (i.e. perform inverse diffusion decoding by using codes corresponding to the first channel). The receivers 312, 322, 332 and 342 receive signals of the second channel. The receivers 313, 323, 333 and 343 receive signals of the third channel. The receivers 314, 324, 334 and 344 receive signals of the fourth channel. The receivers 315, 325, 335 and 345 receive signals of the fifth channel. Each receiver performs delay time adjustment and synthesis process, known as LAKE process, so as to receive a multi-path signal reflected by various objects.

The receivers 311 to 315 of receiver 31, for example, will now be described. The receivers 311 to 315 receive reception signals from the transmission/reception switching circuit 21 and perform predetermined reception processes (inverse diffusion demodulation) associated with the first to fifth channels, thus obtaining reception data. The obtained reception data of the respective channels are input to reception synthesis circuits (Σ) 41 to 45 associated with the respective channels. Further, the receivers 311 to 315 detect reception power (electromagnetic field intensity) levels of the associated channels in order to determine the communication qualities and reception states of the respective antennas, and supply the detection results P11 to P15 to a controller 90 (described later).

The other reception units 32 to 34 perform the same processes as the reception unit 31, and a detailed description thereof is omitted. The reception units 32 to 34 perform predetermined processes for the respective channels and supply the reception data of the respective channels to the reception synthesis circuits 41 to 45. The reception units 32 to 34 similarly detect reception power levels P21 to P25, P31 to P35 and P41 to P45 of the respective channels and supply the detection results to the controller 90.

The reception synthesis circuits 41 to 45 perform weighting processes for the reception data of first to fifth channels obtained by the four antennas 11 to 14 in accordance with reception levels on the basis of a control signal from the controller 90. The reception synthesis circuits 41 to 45 synthesize processed results and supply reception data RxD1 to RxD5 of respective channels to signal process units of a rear stage (not shown).

The transmission data TxD1 to TxD5 of respective channels are supplied to the transmission/reception switching circuits 21 to 24 via a first connection circuit 50, a transmission unit 60, a second connection circuit 70 and transmission synthesis circuits 81 to 84. Connection in the first connection circuit 50 and second connection circuit 70 is controlled by the controller 90. The first connection circuit 50 has five input terminals for receiving transmission data TxD1 to TxD5 of respective channels and six output terminals. The first to fifth output terminals output transmission data TxD1 to TxD5 of first to fifth channels, and the sixth output terminal outputs one of transmission data TxD1 to TxD5 of first to fifth channels which is designated by the controller 90. The number of output terminals corresponds to the number of transmitters of the transmission unit 60 (described later). Thus, the number is not limited six and may be at least six.

The transmission unit 60 has transmitters (Tx) 61 to 66. The transmitters 61 to 66 correspond to the six output terminals of the first connection circuit 50., The transmitters 61 to 66 receive the transmission data, respectively. The first to fifth transmitters 61 to 65 correspond to the first to fifth channels. Using predetermined diffusion codes corresponding to the respective channels, the first to fifth transmitters 61 to 65 perform diffusion modulation processes and then perform D/A conversion and filtering. Thereafter, the first to fifth transmitters 61 to 65 frequency-convert the input data to signals of radio frequencies. The sixth transmitter 66, which is an auxiliary transmitter, performs a diffusion modulation process with use of other diffusion codes and then performs a transmission process. Specifically, in this embodiment, with respect to one of the five channels, two different coding processes are performed to transmit signals. The auxiliary transmitter may be used only when there is a possibility of inter-channel interference and ordinary diversity control is insufficient. Alternatively, the auxiliary transmitter may always be used so that two different coding processes are performed for one channel without fail.

Transmission signals obtained by transmission processes of the first to sixth transmitters 61 to 66 are input to the second connection circuit 70. The second connection circuit 70 has six input terminals and four output terminal groups. Each output terminal group comprises two or more and six or less (three in this case) output terminals. The second connection circuit 70 is provided for diversity transmission. Under control of the controller 90, the second connection circuit 70 connects the output signals of transmitters 61 to 66 to an associated one of the four output terminal groups.

The four output terminal groups of the second connection circuit 90 are connected to transmission synthesis circuits (Σ) 81 to 84. The transmission synthesis circuits 81 to 84 synthesize transmission signals output from the plural (three in this case) output terminals included in each output terminal group of the second connection circuit 70. The synthesis results are radiated to the space from the antennas 11 to 14 via the associated transmission/reception switching circuits 21 to 24.

Figure 2:
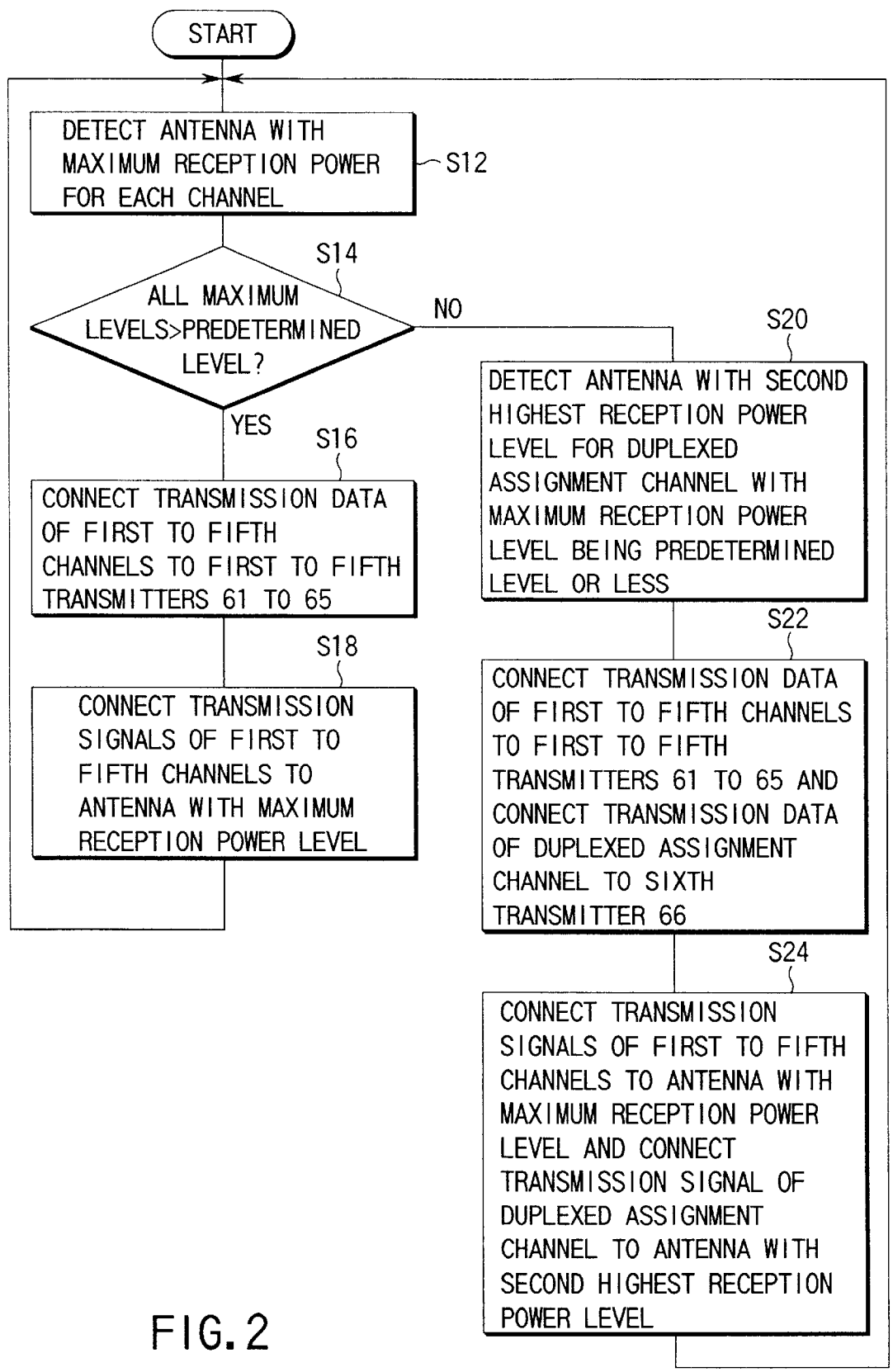
FIG. 2 is a flow chart showing an operation of the first embodiment.

The diversity transmission control operation of the base station according to the present embodiment will now be described with reference to the flow chart of FIG. 2.

In step S12, the controller 90 monitors the data P11 to P15, P21 to P25, P31 to P35, P41 to P45 indicating reception power levels of respective channels from the receivers of the reception units 31 to 34. The controller 90 finds the antenna (with best communication quality and reception state) by which a reception signal with a maximum reception power level is obtained for each channel. Suppose that the reception power level of antenna 12 is maximum for the first channel, the reception power level of antenna 11 is maximum for the second and third channels, the reception power level of antenna 13 is maximum for the fourth channel, and the reception power level of antenna 12 is maximum for the fifth channel.

In step S14, it is determined whether or not maximum reception power levels of all channels are predetermined levels or above. If the maximum power level is a predetermined level of below, inter-channel interference may occur and the reception power level is not reliable. Even if the diversity transmission control is carried out on the basis of such reception power level, it is highly possible that the optimal antenna may be erroneously selected.

Figure 3:
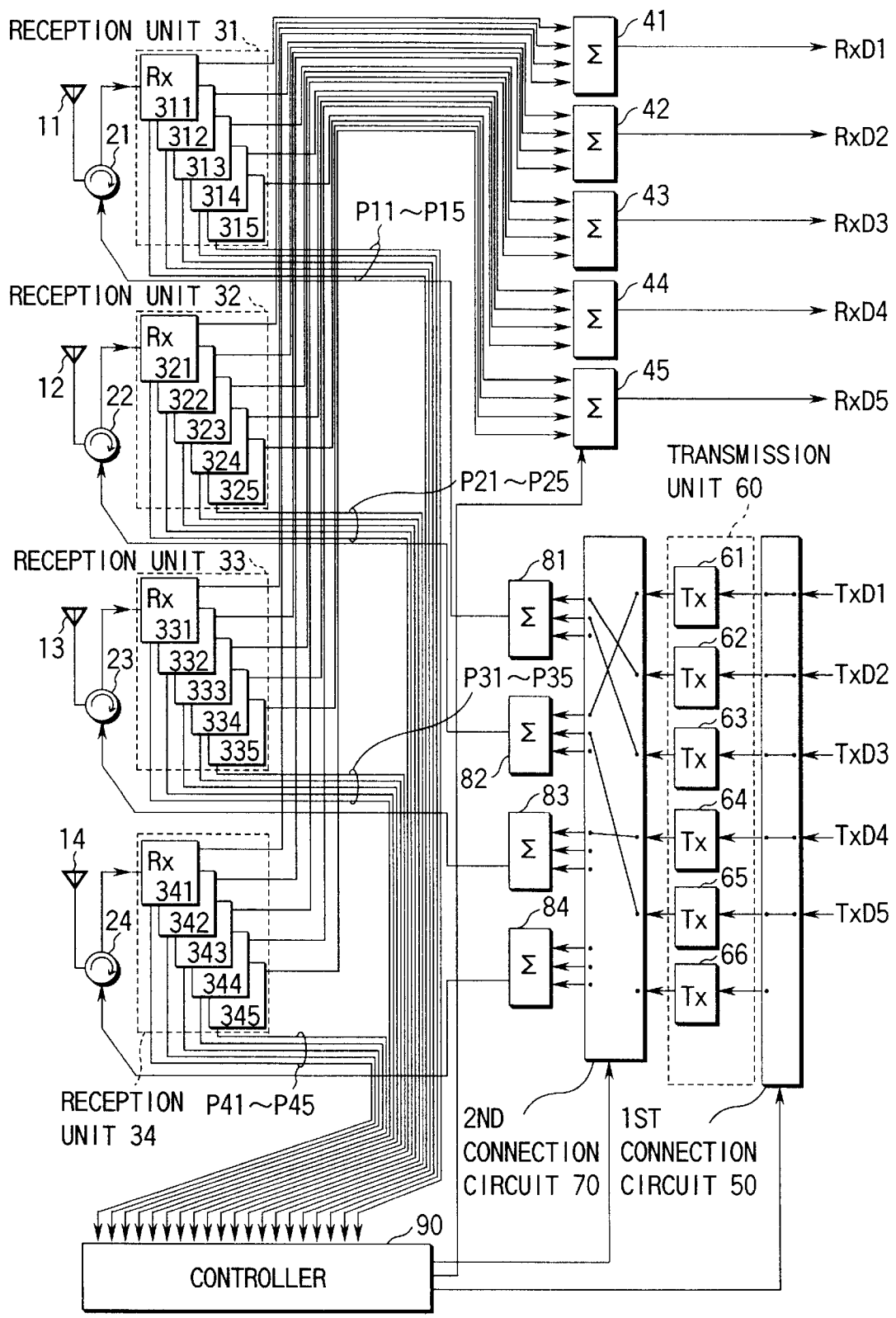
FIG. 3 shows a diversity transmission operation in a case where a maximum reception power level of all channels is greater than a predetermined level in the first embodiment.

If it is determined in step S14 that the maximum reception power levels of all channels are predetermined level or above, an ordinary diversity transmission control is performed. FIG. 3 shows the connection states in the first and second connection circuits 50 and 70 in this case.

In step S16, the controller 90 controls the connection in the first connection circuit 50 so that the transmission data TxD1 to TxD5 of respective channels input to the first to fifth input terminals are supplied to the transmitters 61 to 65 of associated channels. The connection is controlled such that no transmission data of any channel is supplied to the transmitter 66.

In step S18, the controller 90 controls the connection in the second connection circuit 70 so that the transmission signals of respective channels (outputs of transmitters 61 to 65 of respective channels) may be supplied to the transmission synthesis circuits connected to the antennas by which the reception signals of maximum reception power levels of respective channels have been obtained. Specifically, the transmission signals of the first and fifth channels, which are outputs of transmitters 61 and 65, are connected to the transmission synthesis circuit 82 for second antenna 12. The transmission signals of the second and third channels, which are outputs of the transmitters 62 and 63, are connected to transmission synthesis circuit 81 for first antenna 11, and the transmission signal of the fourth channel, which is an output of the transmitter 64, is connected to transmission synthesis circuit 83 for third antenna 13.

As a result, the transmission signals of the second and third channels synthesized by the transmission synthesis circuit 81 and supplied via the transmission/reception switching circuit 21 is transmitted to the space from the antenna 11. The transmission signals of the first and fifth channels synthesized by the transmission synthesis circuit 82 and supplied via the transmission/reception switching circuit 22 is transmitted to the space from the antenna 12. The transmission signal of the fourth channel is transmitted to the space from the antenna 13 via the transmission synthesis circuit 83 and transmission/reception switching circuit 23. No transmission signal is radiated from the antenna 14 since the reception signal of the maximum reception power level was not obtained for any of the channels. Thus, the transmission signals of the respective channels are transmitted via the antennas with maximum reception power levels, and the diversity transmission control is carried out.

Subsequently, the control returns to step S12 and the above operations are repeated.

Figure 4:
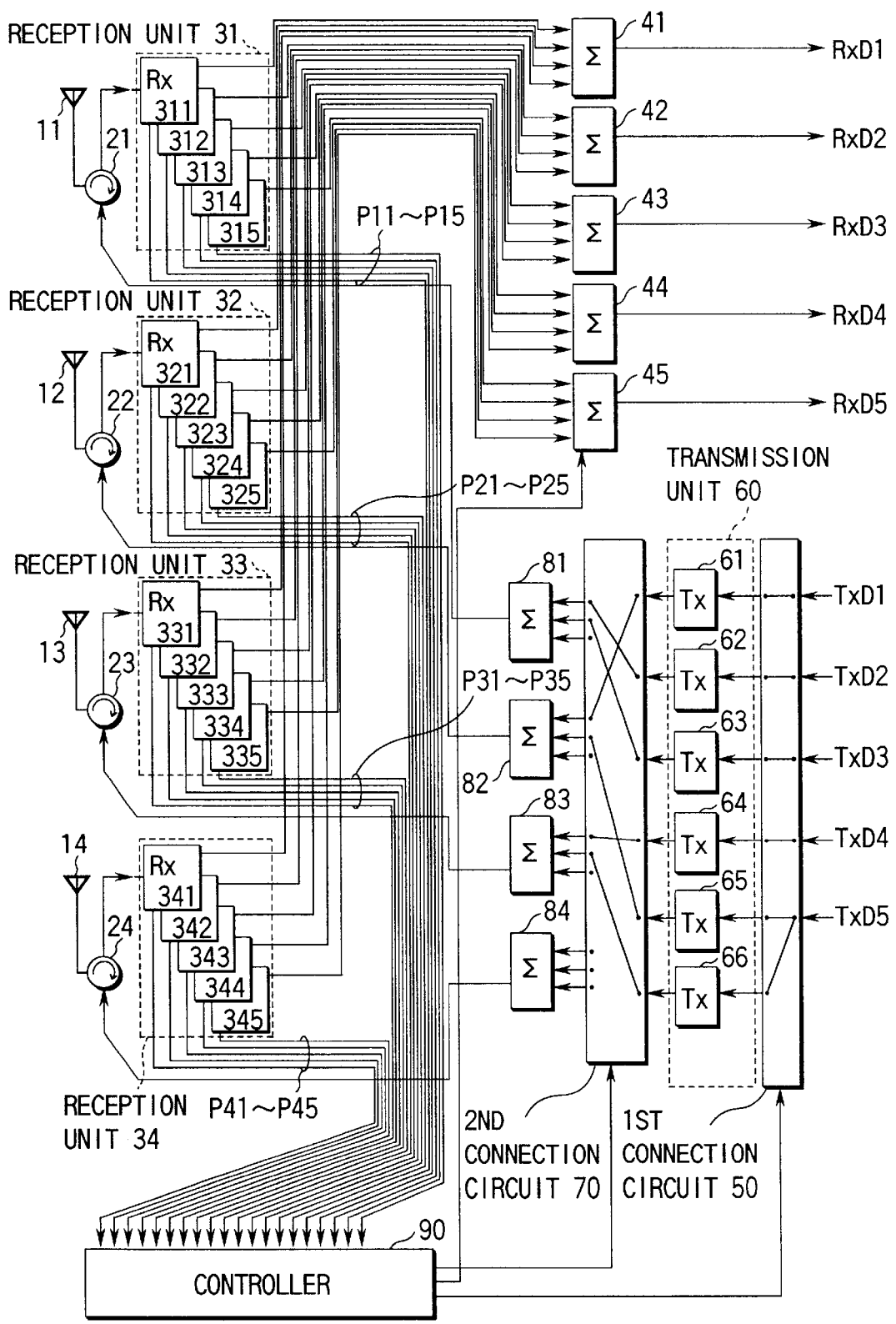
FIG. 4 shows a diversity transmission operation in a case where a maximum reception power level of at least one channel is a predetermined level or less in the first embodiment.

If it is determined in step S14 that there is a channel for which the maximum reception power level is a predetermined level or less, a control using the auxiliary transmitter 66 is carried out. The reason is that in this case there is a possibility that an upward propagation path from the mobile station to the base station has interfered with another channel and the communication qualities of all propagation paths have deteriorated and consequently the antenna with maximum reception power level is not necessarily the optimal antenna. Suppose that the reception power levels of respective channels are as mentioned above and the maximum value (reception power level of antenna 12) for the fifth channel is a predetermined value or less. In the following description, the fifth channel is referred to as a duplex assignment channel. FIG. 4 shows the connection states in the first and second connection circuits 50 and 70 in this case.

In step S20, the antenna with the second highest reception power level for the fifth channel is found. Suppose that the reception power level of third antenna 13 is second highest.

In step 22, the controller 90 controls the connection in the first connection circuit 50 so that the transmission data TxD1 to TxD5 of respective channels input to the first to fifth input terminals may be supplied to the transmitters 61 to 65 of the associated channels and also the transmission data TxD5 of the duplex assignment channel (fifth channel with the maximum value being the predetermined level of less) may be supplied to the sixth transmitter 66.

In step S24, the controller 90 controls the connection in the second connection circuit 70 so that the outputs from the transmitters 61 to 65 of: respective channels may be supplied to the transmission synthesis circuits connected to the antennas with which the reception signals of highest levels of respective channels were obtained and also the transmission signal of the duplex assignment channel (the fifth channel; however, this fifth channel being referred to as "fifth prime (5') channel" since the signal in this channel has been diversion-modulated with use of a code different from the original one), which is the output from the auxiliary transmitter 66, may be supplied to the transmission synthesis circuit connected to the antenna with which the second highest reception power level of fifth channel was obtained. Specifically, the transmission signals of the first and fifth channels, which have been output from the transmitters 61 and 65, are supplied to the transmission synthesis circuit 82 for second antenna 12. The transmission signals of the second and third channels, which have been output from the transmitters 62 and 63, are supplied to the transmission synthesis circuit 81 for first antenna 11. The transmission signals of the fourth and fifth prime (5') channels, which have been output from the transmitters 64 and 66, are supplied to the transmission synthesis circuit 83 for second antenna 13.

As a result, the transmission signals of the second and third channels synthesized by the transmission synthesis circuit 81 and supplied via the transmission/reception switching circuit 21 is transmitted to the space from the antenna 11. The transmission signals of the first and fifth channels synthesized by the transmission synthesis circuit 82 and supplied via the transmission/reception switching circuit 22 is transmitted to the space from the antenna 12. The transmission signals of the fourth and fifth prime (5') channels synthesized by the transmission synthesis circuit 83 and supplied via the transmission/reception switching circuit 23 are transmitted to the space from the antenna 13. No transmission signal is radiated from the antenna 14 since the reception signal of the maximum reception power level was not obtained for any of the channels. Thus, the transmission signals of the respective channels are transmitted via the antennas with maximum reception power levels, and the transmission signal of the channel with the maximum reception power level being the predetermined level or less is transmitted also via the antenna with the second highest reception power level. Accordingly, the possibility of selecting the optimal antenna increases and as a result the communication quality is enhanced.

Needless to say, each mobile station is provided with two receivers so as to receive two diversity-modulated transmission signals from the base station.

As has been described above, according to the diversity transmission system of this embodiment, a plurality of antennas are provided and a transmission signal from a mobile station is received by plural antennas. Based on reception results, one of the antennas (propagation paths) which has a highest communication quality is found and transmission to the mobile station is carried out via this antenna. If communication qualities of all propagation paths have deteriorated, it is determined that the upward propagation path from the mobile station to the base station interferes with another channel and detection precision of parameters indicating the communication quality of each path has lowered. Thus, the auxiliary transmitter is also used for the channel with the maximum reception power level being the predetermined level or less, two kinds of coding processes are performed, and the obtained signals are transmitted from different antennas. Accordingly, the possibility of selecting the optimal antenna increases and as a result the communication quality can be enhanced. Since the auxiliary transmitter is used, the traffic of other channels is not affected. Since two antennas are assigned to only the channel with the maximum reception power level being the predetermined level or less, the channel is not unnecessarily occupied, nor is the power consumption increased.

The present invention is not limited to the above embodiment.

In the embodiment, the auxiliary transmitter 66 is used only in the case where there is a possibility of occurrence of inter-channel interference and an ordinary diversity control is insufficient. However, irrespective of whether or not the maximum reception power level is the predetermined level or less, the auxiliary transmitter 66 may always be used for the channel with a lowest maximum reception power level and two different coding processes are always carried out for one channel for transmission.

The number of auxiliary transmitters 66 is not limited to one. If two or more auxiliary transmitters 66 are provided, there is no problem even if two or more channels have maximum reception power levels being a predetermined level or less.

The number of terminals of second connection circuits 70 connected to the same antenna, i.e. the number of terminals of the output terminal group, is not limited to three. Needless to say, the invention can be worked if the number is two or more.

In the above embodiment, reception power levels from the reception units 31 to 34 are used by the controller 90 as parameters for determining the transmission antenna assignment. Needless to say, the same advantage can be obtained even if the transmission antenna assignment is determined, for example, on the basis of a signal/noise ratio of a desired signal to noise of interference by another channel, a so-called CN ratio, or CI ratio.

In the above embodiment, parameters for finding the optimal transmission antenna and parameters for finding the channel for which the auxiliary transmitter is used are the same (reception electric field intensity). However, it is not necessary to use the same parameters. For example, the reception electric field intensity may be used on the one hand, and the signal/noise ratio on the other.

The transmitters 61 to 66 were described as having two functions: a diffusion modulation function using diffusion codes, and a frequency conversion function of frequency-converting a D/A converted analog transmission signal to a radio-frequency signal. The invention can be worked even if these functions are separated. For example, diffusion modulators may be provided at the positions of transmitters 61 to 66 in FIG. 1, and frequency converters may be provided between the transmission synthesis circuits 81 to 84 and transmission/reception switching circuits 21 to 24.

In the above description, transmission for at least one channel is carried out via two antennas. If two or more auxiliary transmitters are provided, transmission may be carried out via tree or more antennas.

The CDMA system was adopted as an example of the multi-channel access system. However, TDMA (Time Division Multiple Access) system or FDMA (Frequency Division Multiple Access) may be adopted.

In the above description, one antenna has one propagation path. If one antenna is provided with plural propagation paths, one of the paths may be selected. In this case, the number of antennas may be one.

Other modifications may be made without departing from the spirit of the invention.

INDUSTRIAL APPLICABILITY

As has been described above, in the present invention, transmitters, the number of which is greater than the number of channels, are provided in a radio communication apparatus of a diversity transmission system. With respect to a channel which is considered to be affected by inter-channel interference or which is considered in a degraded reception state, based on reception states of respective antennas, signal transmission is carried out from plural antennas via plural transmitters. Thus, the communication quality can be enhanced without lowering the frequency use efficiency.

What is claimed is:

1. A radio communication apparatus connected to a radio communication terminal via a radio line, the apparatus comprising:
   m antennas (m being a positive integer of 2 or more);
   n receivers (n being a positive integer of 2 or more), connected to the m antennas respectively, for receiving multiplex signals received by the respective antennas for respective channels;
   means for detecting reception states of the respective antennas for the respective channels in accordance with outputs from the n receivers;
   (n+i) transmitters (i being a positive integer of 1 or more);
   means for detecting presence/absence of inter-channel interference based on outputs from the reception states detecting means; and
   diversity means for supplying, when the absence of inter-channel interference has been detected, each of transmission signals of the n channels to one of the antennas with best reception state for the respective channels via n transmitters of the (n+i) transmitters, and for supplying, when the presence of inter-channel interference has been detected, each of the transmission signals of the n channels to one of the antennas with best reception state for the respective channels via the n transmitters of the (n+i) transmitters and also supplying the transmission signal of the channel, with which the presence of inter-channel interference has been detected, to the antenna of second best reception state via i transmitters of the (n+i) transmitters.

2. The radio communication apparatus according to claim 1, wherein said reception states detecting means comprises means for detecting a reception electric field intensity of the reception signal of each antenna for each channel.

3. The radio communication apparatus according to claim 1, wherein said reception states detecting means comprises means for detecting a signal/noise ratio of the reception signal of each antenna for each channel.

4. The radio communication apparatus according to claim 1, wherein said multiplex signal is a signal multiplexed by a CDMA system, said n receivers comprise means for despread-demodulating the reception signal with use of codes inherent to each channel, each of the n transmitters of said (n+i) transmitters comprises means for spread-modulating each of the transmission signals with use of each inherent code, and the i transmitters of said (n+i) number of transmitters comprises means for spread-modulating the transmission signal-with-use of codes different from the codes of the n transmitter.

5. The radio communication apparatus according to claim 1, wherein said inter-channel interference detecting means comprises means for detecting maximum reception electric field intensities of the reception signals received by the m antennas for the respective channels, and detecting the presence of inter-channel interference when the maximum reception electric field intensities of all channels are at a predetermined value or less.

6. The radio communication apparatus according to claim 1, wherein said inter-channel interference detecting means comprises means for detecting maximum signal/noise ratios of the reception signals received by the m antennas for the respective channels, and detecting the presence of inter-channel interference when the maximum signal/noise ratios of all channels are at a predetermined value or less.

7. The radio communication apparatus according to claim 1, wherein said diversity means comprises a first connection circuit having n input terminals, to which the transmission signals of the n channels are supplied, and (n+i) output terminals connected to the (n+i) transmitters, a second connection circuit having (n+i) input terminals, to which outputs of the (n+i) transmitters are supplied, and m output terminals connected to the m antennas, and control means for controlling connection of input and output terminals of the first and second connection circuits.

8. A radio communication apparatus connected to a radio communication terminal via a radio link, the apparatus comprising:

m antennas (m being a positive integer of 2 or more);

n receivers (n being a positive integer of 2 or more), connected to the m antennas respectively, for receiving multiplex signals received by the respective antennas for respective channels;

means for detecting reception states of the respective antennas for the respective channels in accordance with outputs from the n receivers;

(n+i) transmitters (i being a positive integer of 1 or more); and diversity means for supplying transmission signals of the n channels to the antennas of best reception states for the respective channels via n transmitters of the (n+i) transmitters, and for supplying the transmission signal of the channel, with which maximum reception quality of each channel is at a predetermined value or less, to the antenna of second best reception state via the other transmitters responsive to the detecting means.

9. The radio communication apparatus according to claim 8, wherein said reception states detecting means comprises means for detecting a reception electric field intensity of the reception signal of each antenna for each channel.

10. The radio communication apparatus according to claim 8, wherein said reception states detecting means comprises means for detecting a signal/noise ratio of the reception signal of each antenna for each-channel.

11. The radio communication apparatus according to claim 8, wherein said multiplex signal is a signal multiplexed by a CDMA system, said n receivers comprise means for despread-demodulating the reception signal with use of codes inherent to each channel, each of the n transmitters of said (n+i) transmitters comprises means for spread-modulating each of the transmission signals with use of each inherent code, and the i transmitters of said (n+i) number of transmitters comprises means for spread-modulating the transmission signal with use of codes different from the codes of the n transmitters.

12. The radio communication apparatus according to claim 8, wherein said diversity means comprises a first connection circuit having n input terminals, to which the transmission signals of the n channels are supplied, and (n+i) output terminals connected to the (n+i) transmitters, a second connection circuit having (n+i) input terminals, to which outputs of the (n+i) transmitters are supplied, and m output terminals connected to the m antennas, and control means for controlling connection of input and output terminals of the first and second connection circuits.

* * * * *